United States Patent
Abbate

(10) Patent No.: US 9,619,078 B2
(45) Date of Patent: Apr. 11, 2017

(54) METHOD AND APPARATUS FOR REDUCING USER DISTRACTION

(71) Applicant: MOTOROLA SOLUTIONS, INC, Schaumburg, IL (US)

(72) Inventor: Alain D Abbate, Coral Springs, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 155 days.

(21) Appl. No.: 14/638,288

(22) Filed: Mar. 4, 2015

(65) Prior Publication Data

US 2016/0259461 A1    Sep. 8, 2016

(51) Int. Cl.
| | |
|---|---|
| *G06F 3/041* | (2006.01) |
| *G06F 3/0481* | (2013.01) |
| *G06F 3/01* | (2006.01) |
| *G06F 1/16* | (2006.01) |
| *H04M 1/725* | (2006.01) |

(52) U.S. Cl.
CPC .......... *G06F 3/0416* (2013.01); *G06F 1/1626* (2013.01); *G06F 3/013* (2013.01); *G06F 3/017* (2013.01); *G06F 3/0412* (2013.01); *G06F 3/04817* (2013.01); *H04M 1/72569* (2013.01); *H04M 1/72577* (2013.01); *H04M 1/72572* (2013.01)

(58) Field of Classification Search
CPC .................................................... G06F 3/0416
USPC .................. 345/647; 348/77; 340/573.1, 576
See application file for complete search history.

(56) References Cited

U.S. PATENT DOCUMENTS

| 7,394,392 B1 * | 7/2008 | Roe ........................ B60K 28/06 |
| | | 180/272 |
| 8,644,165 B2 | 2/2014 | Saarimaki et al. |
| 2004/0203667 A1 * | 10/2004 | Schroeder ............. H04W 48/04 |
| | | 455/414.1 |
| 2008/0085732 A1 * | 4/2008 | Mizuide ................ H04W 48/04 |
| | | 455/519 |
| 2011/0095908 A1 * | 4/2011 | Nadeem ................... B60H 3/00 |
| | | 340/905 |
| 2011/0111724 A1 | 5/2011 | Baptiste |

(Continued)

OTHER PUBLICATIONS

Andrew Kun et al., "User interfaces for first responder vehicles: views from practitioners, industry, and academia", 7th Annual Conference on Automotive User Interfaces and Interactive Vehicular Applications, Sep. 1, 2015, pp. 163-170.*

(Continued)

*Primary Examiner* — Kimberly A Williams

(57) ABSTRACT

A method and apparatus for reducing user distraction is provided herein. During operation a user device will show content for limited periods of time during a context where the user is not to be distracted. So for example, a police officer driving may only be able to look at the screen of his device for a first period of time (e.g., 3 seconds). After that period of time, the device will prevent further viewing (preferably by turning off the screen). After a second period of time (e.g., 10 seconds), the device will again allow the officer to look at the screen for the first period of time. When the device has determined that user distraction does not need to be prevented, the device will allow full access to the user.

13 Claims, 3 Drawing Sheets

(56) References Cited

U.S. PATENT DOCUMENTS

| | | | |
|---|---|---|---|
| 2011/0195685 A1* | 8/2011 | Bridges | H04L 12/66 455/404.1 |
| 2012/0189129 A1 | 7/2012 | Gabara | |
| 2012/0268235 A1* | 10/2012 | Farhan | G05B 23/0278 340/3.1 |
| 2013/0278405 A1 | 10/2013 | Bacal | |
| 2013/0303143 A1 | 11/2013 | Schrader et al. | |
| 2014/0045477 A1 | 2/2014 | Ewell et al. | |
| 2014/0058730 A1* | 2/2014 | Costa | G10L 15/265 704/235 |
| 2014/0113619 A1 | 4/2014 | Tibbitts et al. | |
| 2014/0287736 A1* | 9/2014 | Meers | H04M 1/72577 455/418 |
| 2015/0288802 A1* | 10/2015 | Medina | H04M 1/72577 455/418 |
| 2016/0042767 A1* | 2/2016 | Araya | G11B 19/02 386/201 |
| 2016/0101784 A1* | 4/2016 | Olson | B60W 40/08 340/576 |
| 2016/0242014 A1* | 8/2016 | Mayer | H04W 4/18 |

OTHER PUBLICATIONS

Matt Richtel, "Gadgets in Emergency Vehicles Seen as Peril", The New York Times: Technology: Driven to Distraction, Mar. 10, 2010, pp. 1-4.*

The International Search Report and the Written Opinion, App. No. PCT/US2016/019546, filed: 225 Feb. 2016, all pages.

* cited by examiner

METHOD AND APPARATUS FOR REDUCING USER DISTRACTION

FIELD OF THE INVENTION

The present invention generally relates to reducing user distraction, and more particularly to a method and apparatus for reducing user distraction by allowing periodic viewing of a device.

BACKGROUND OF THE INVENTION

It is easy to focus on a mobile device or computer to the point where the device operator is unaware of his/her surroundings. This is acceptable in some situations but is not acceptable when the device operator is a public-safety officer in a dangerous situation such as a traffic stop. A public-safety-officer must remain aware of what is going on around them. Since a public-safety officer frequently has material on a device that needs to be viewed, simply making this material non-viewable in certain situations is not an optimal solution. A more optimal solution would be one that allows the officer to look at a mobile device for short periods of time during certain situations. Therefore, a need exists for a method and apparatus for reducing user distraction in certain situations, while still allowing the user to view/access material on the device during those certain situations.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above, mentioned need, a method and apparatus for reducing user distraction is provided herein. During operation a user device will show content for limited periods of time during a context where the user is not to be distracted. So for example, a police officer driving may only be able to look at the screen of his device for a first period of time (e.g., 3 seconds). After that period of time, the device will prevent further viewing (preferably by turning off the screen). After a second period of time (e.g., 10 seconds), the device will again allow the officer to look at the screen for the first period of time. When the device has determined that user distraction does not need to be prevented, the device will allow full access to the user.

Figure 2:
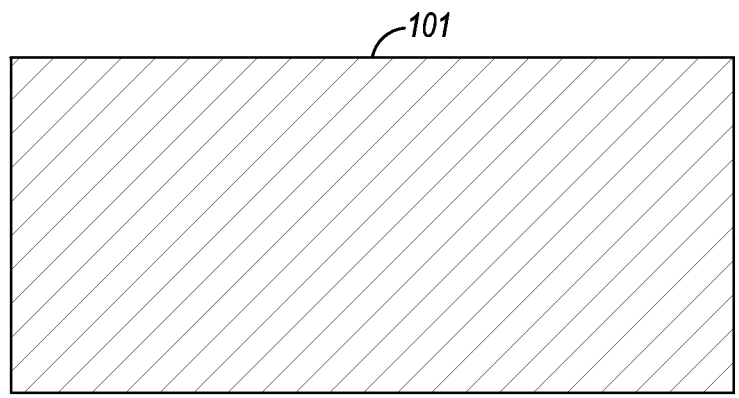
FIG. 2 shows operation of the device of FIG. 1.
Figure 3:
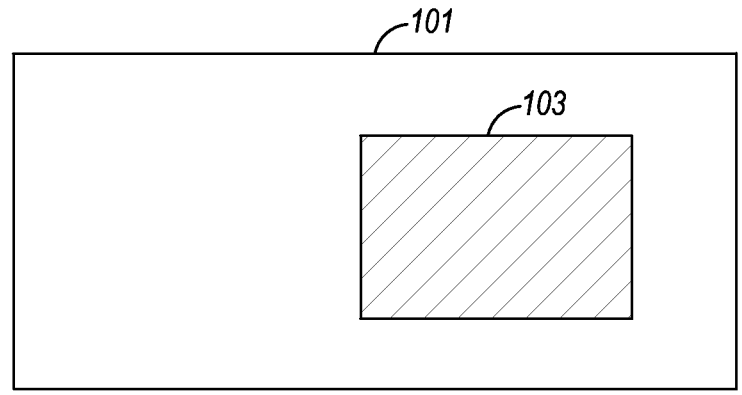
FIG. 3 shows operation of the device of FIG. 1.

The above-described technique forces the user to alternate between focusing on the device (display is active) and focusing on his/her surroundings (display inactive). This greatly reduces the user from becoming distracted from their surroundings. It should be noted that unlike prior-art techniques for limiting distractions, the user is allowed to view/access the device for limited periods of time even though the dangerous situation may exist. The above-described technique is illustrated in FIG. 1 through FIG. 3.

Figure 1:
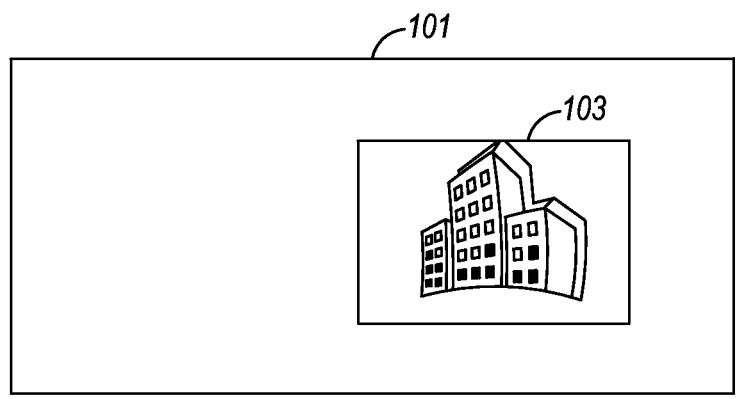
FIG. 1 illustrates a device displaying information.

FIG. 1 shows a screen 101 of a user device. Screen 101 may be part of a computer, smart phone, police radio, police terminal, tablet computer, or any other portable or stationary device that displays information. Screen 101 preferably comprises a touch screen that provides both an output interface and an input interface between the device and a user. Screen 101 displays visual output to the user. The visual output may include text, graphics, video, windows, and any combination thereof. Some or all of the visual output may correspond to currently-running applications.

Touch screen 101 also accepts input from the user based on haptic and/or tactile contact. The touch screen 101 forms a touch-sensitive surface that accepts user input. The touch screen 101 detects contact (and any movement or break of the contact) on the touch screen 101 and converts the detected contact into interaction with user-interface objects, such as one or more user-interface elements (e.g., soft keys), that are displayed on the touch screen. Touch screen 101 may use LCD (liquid crystal display) technology, or LPD (light emitting polymer display) technology, although other display technologies may be used in other embodiments.

As shown in FIG. 1, touch screen 101 displays content 103, which in this particular example comprises window 103, under the control of a particular application. For example, window 103 may show a video output of a security camera. Although one window is shown on touch screen 101, one of ordinary skill in the art will recognize that multiple windows may be simultaneously running on touch screen 101.

As discussed above, a public-safety-officer must remain aware of what is going on around them. Referring to FIG. 1, a public-safety officer may be in a critical situation where staring at the video camera feed 103 for long periods of time will put the officer in a dangerous situation. However, it would be inconvenient for the officer if the video feed was completely unavailable. Thus, during operation content will be shown for limited periods of time during a situation/context where the user is not to be distracted. This is shown in FIG. 1. After the limited period of time, the device will prevent further viewing (preferably by turning off or making the screen or window opaque) as shown in FIG. 2 and FIG. 3. It should be noted that during periods where the device will prevent viewing, the device will also prevent input from the user via the touch schreen. After a second period of time (e.g., 10 seconds), the device will again allow the officer to look at the screen for the limited period of time, as shown in FIG. 1. When the device has determined that user distraction does not need to be prevented, the device will allow full access to the user without preventing the viewing of content (and accept input from the user).

The device may prevent viewing of content as shown in FIG. 2 by simply blacking out a particular window, or alternatively, the device may prevent viewing of content by blacking out the whole screen as shown in FIG. 3. In alternate embodiments of the present invention, where multiple windows exist on screen 101, only certain windows (deemed of lesser importance) may have their content hidden as shown above.

Once a dangerous situation has been detected by the device, and the user looks at screen 101, the device starts a first timer with duration Tuse (Tuse timer). The Tuse timer limits the amount of time a user can spend focused on (interact with) the mobile device. It should be noted that in a preferred embodiment, if the user looks away from the device, prior to Tuse expiring, the Tuse timer may be reset to zero upon the user again looking at screen 101. However, if the user does not look away from screen 101 prior to the Tuse timer expiring (e.g., longer than Tuse), then the screen view is prevented as discussed above.

The device will prevent screen viewing (and prevent input from the user) for a time period of Tblocked. This is accomplished by using a second timer (Tblocked timer), screen 101 will remain blocked from running until the Tblocked timer expires.

The above-described operation of a device results in the device determining that a context exists where the user should not be distracted from their surrounding environment. When this occurs, the device will determine when the user is viewing screen 101 and only allow the user to view the screen for a first period of time (Tuse). If the Tuse timer expires, the device will restrict access for a second period of time (Tblocked). It should be noted that in a preferred embodiment, the first period of time is started when the device detects that the user has looked at the screen. So, for example, Tuse does not automatically start simply when a dangerous situation exits, but starts when the dangerous situation exists and the user has glanced at the screen. In other embodiments of the present invention Tuse may start immediately when the dangerous situation is detected.

Figure 4:
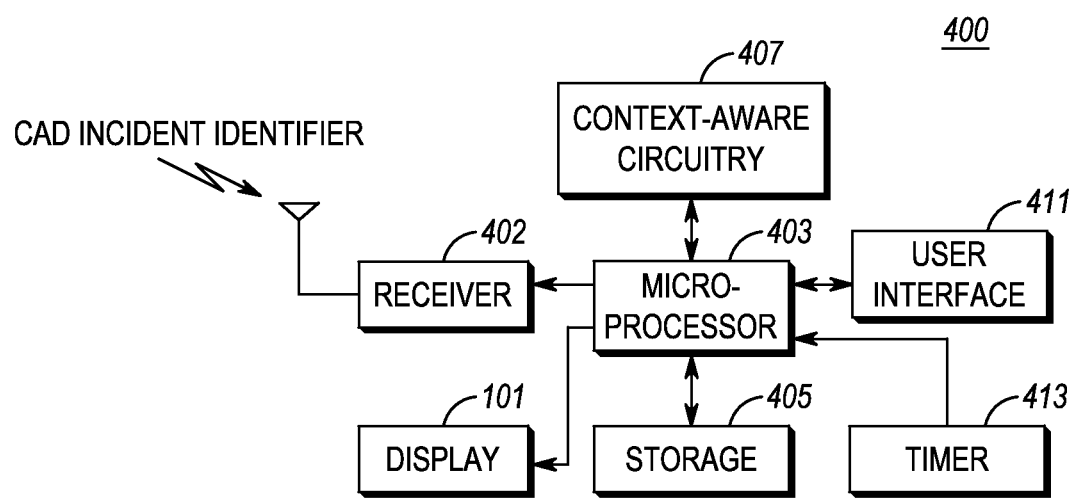
FIG. 4 is a block diagram of the device of FIG. 1.

FIG. 4 is a block diagram of device 400 used to perform the above-mentioned technique. Although the elements of FIG. 4 can exist within a single device 400, in alternate embodiments of the present invention, these elements may exist separately as part of a "user space". The user space can be defined as the user's personal space that includes all the electronic devices, communication devices, sensors and displays that a user would carry. These devices carried by the user typically communicate with each other using wired or wireless communication protocols. For example, a public safety official may carry one or more communications radios with their in-built individual displays and sensors such as a compass, gyroscope, accelerometer, holster detector, pedometer etc., wearable devices such as helmet cameras, wrist displays, head-mounted displays, body harness or jackets with in-built devices such as a lapel camera, sensors like temperature sensors, microphone, etc. In such a case, the components shown in FIG. 4 are distributed amongst many physical devices within a user space that communicate with each other using wired or wireless communications protocols such as Bluetooth, Near Field Communications, Wireless Local Area Network etc. In alternate embodiments, the user space extends to a user's vehicular space for example when the user is traveling in a vehicle and would additionally have access to the electronic devices, communications devices, displays and sensors in the vehicle via wired or wireless communications protocols such as Bluetooth, Near Field Communications, Wireless Local Area Network etc.

Device 400 preferably comprises processor 403 that is communicatively coupled with various system components, including display 101, receiver 402, general storage component 405, context-aware circuitry 407, timer 413, and potentially, a user interface (GUI) 411. Only a limited number of system elements are shown for ease of illustration; but additional such elements may be included in the device.

Processor 403 may be partially implemented in hardware and, thereby, programmed with software or firmware logic or code for performing functionality described herein; and/or the processor 403 may be completely implemented in hardware, for example, as a state machine or ASIC (application specific integrated circuit). The processor 403 is configured to process the received information from various components in order to determine whether or not to block access to screen 101.

Storage 405 can include short-term and/or long-term storage of various information needed for determining whether or not to block access to screen 101. For example, storage 405 may be populated with locations (for location-based blocking), a computer-aided-dispatch (CAD) incident database (for CAD incident-based blocking), . . . , etc. Storage 405 may further store software or firmware for programming the processor 403 with the logic or code needed to perform its functionality, including but not limited to the logic or code needed to determine when to block viewing of display 101.

User interface 411 receives an input from the user which may be used to populate storage 405. User interface 411 may include a keypad, a display/monitor, a mouse/pointing means, and/or various other hardware components to provide a man/machine interface. In some embodiments, no user intervention will be needed to activate this invention on the said device.

Although context-aware circuitry 407 is shown as a single item, it is invisioned that circuitry 407 may comprise more than one logic circuitry to determine various contexts simultaneously. For example, context-aware circuitry 407 may comprise one or more of an eye detector, a GPS receiver, a motion detector and/or an accelerometer. Regardless of the makeup of context-aware circuitry 407, processor 403 will use information generated by circuitry 407 to determine whether or not to block viewing of screen 101.

Receiver 402 comprises common circuitry known in the art for communication utilizing a well known communication protocol, and serve as means for receiving, for example, a CAD incident identifier from a dispatch center. For example, receiver 302 may be well known long-range transceivers that utilize the Apco 25 (Project 25) communication system protocol. Other possible receivers include receivers using the IEEE 802.11 communication system protocol, receivers utilizing Bluetooth, receivers utilizing HyperLAN protocols, or receivers utilizing any other communication system protocol including but not limited to a land mobile radio system (LMRS), a public land mobile radio, a private land mobile radio system, a first responders network authority (FirstNet) nationwide network (FNN), an enhanced data rates for Global System for Mobile Communication (GSM) Evolution (EDGE) Radio Access Network (GERAN), a Universal Terrestrial Radio Access Network (UTRAN) and/or an Evolved Universal Terrestrial Radio Access (E-UTRAN) as defined by the long term evolution (LTE), LTE-advance (LTE-A) and subsequently defined in subsequent releases, such as LTE-beyond (LTE-B), Near Field Communications, mesh networking etc.

Determining when User should not be Distracted from their Surroundings

There are multiple ways envisioned for determining when a user should not be distracted from their surroundings, the discussion of which is not meant to limit any particular technique for doing so. Additionally, multiple techniques may be simultaneously used. Some of the preferred techniques are described below.

Context-aware circuitry 407 may comprise a holster detector that determines when an officer has drawn their gun. During periods when the officer's gun is un-holstered, viewing of screen 101 may be limited as discussed above.

Context-aware circuitry 407 may comprise a location detector that determines a current location of the device. For example, context-aware circuitry may comprise a GPS receiver. Unsafe locations may be stored in storage 405. At locations deemed unsafe, viewing of screen 101 may be limited as discussed above.

Context-aware circuitry 407 may comprise a location detector that determines a current speed of the device. For example, context-aware circuitry may comprise a GPS receiver. Unsafe speeds may be stored in storage 405. At speeds deemed unsafe, viewing of screen 101 may be limited as discussed above.

The officer may be assigned to a particular incident. A CAD incident identifier may be received by receiver 402. An incident identification (sometimes referred to as an incident scene identifier, or a CAD incident identifier) is generated for incidents where the officer is dispatched. This ID could be something as simple as a number, or something as complicated as an identification that is a function of populated fields, one of which may comprise an incident type. Unsafe incident types may be stored in storage 405. While being assigned to incidents deemed unsafe, viewing of screen 101 may be limited as discussed above.

Context-aware circuitry 407 may comprise a motion detector (e.g., a camera and logic circuitry) that determines any movement in an officer's surroundings. Unsafe motions may be stored in storage 405. For example, motion behind an officer may be deemed unsafe. Other potential motions deemed unsafe include motion of a suspect towards the officer (potential assault), motion away from the officer (potential attempt to escape), suspect removing an item from pockets (potential weapon). When motions deemed unsafe are detected, viewing of screen 101 may be limited as discussed above.

Context-aware circuitry 407 may comprise sensors that determine the distance between an officer and the officer's vehicle. Exceeding a threshold distance from the vehicle may be deemed unsafe. When the threshold distance from the vehicle is exceeded, viewing of screen 101 may be limited as discussed above.

Public safety radios typically have an emergency button. Thus, context-aware circuitry 407 may comprise an emergency button. Pressing the emergency button may limit viewing of screen 101 as discussed above.

Context-aware circuitry 407 may comprise bio-monitoring sensors that detect elevated heart rate, elevated breathing rate or other indications of a stressful or unsafe situation. When unsafe biological indications are detected, viewing of screen 101 may be limited as discussed above.

Context-aware circuitry 407 may comprise vehicle sensors that detect activation of siren or police light-bar, which may limit viewing of screen 101 as discussed above.

Determining when User is Viewing Screen

In a preferred embodiment of the present invention context-aware circuitry 407 comprises standard eye-detection circuitry as is commonly known in the art. This circuitry can be used to determine when the user is viewing screen 101.

In an alternate embodiment, context-aware circuitry 407 may comprise an accelerometer that is used to determine if a user is viewing screen 101. Accelerations may be used to determine if the user is viewing screen 101. For example, a screen angled away from user's view may indicate a user is not viewing screen 101. Similarly, a lowered screen may indicate a user is not viewing screen 101.

Restricting Viewing

Processor 403 may be configured to restrict viewing of screen 101 by instructing screen 101 to block viewing of a particular window displayed on screen 101 (as shown in FIG. 2). In response to the instructions, screen 101 may make opaque a particular window as described above. Additionally, processor 403 may be configured to restrict viewing of screen 101 by instructing screen 101 to block complete viewing of screen 101 (as shown in FIG. 3). In response to the instructions, screen 101 may make itself opaque.

In one embodiment of the present invention an additional amount of time is given to a user to finish a partially completed application action (e.g. finish entering a field in a data entry app). For example, if the user is engaged in an application that requires much more time than Tuse to complete, the user will need to repeatedly pause and resume the application. Applications may have natural "break points" where it is less disruptive to pause. For example, if the user is filling in a traffic stop form, it is less disruptive to pause after a field (e.g. drivers license number) has been completely entered than to pause in the middle of entering a field. If the user is entering free form text, it is better to pause after a complete sentence has been entered than in the middle of a sentence, or better to pause after a complete word has been entered than in the middle of entering a word. Thus, even after the Tuse timer has expired, screen 101 may not be blocked until after:

a user has finished inputting a line of text;
a user has entered a complete field (license tag number, drivers license number, vehicle registration number, phone number, etc.) into an application. Examples of applications an officer might use are suspects arrest record query, stolen vehicle query, issuing a citation, or documenting a traffic incident.

In another embodiment of the present invention, the completing entering an entire field is used as a way to end Tuse early, rather than extending Tuse. For example, in the simple case 8 seconds may be allocated for a user to look at the screen. Completing entering an entire field can be used to modify (shorten) the 8 second period. For example, an initial period of 5 seconds may be given to complete a line item, during which the user could look at the screen, followed by a period of 3 seconds during which the user could continue to look at the screen, but only until entering a field was completed. Thus the amount of time the user can look at the screen would be 5-8 seconds.

Figure 5:
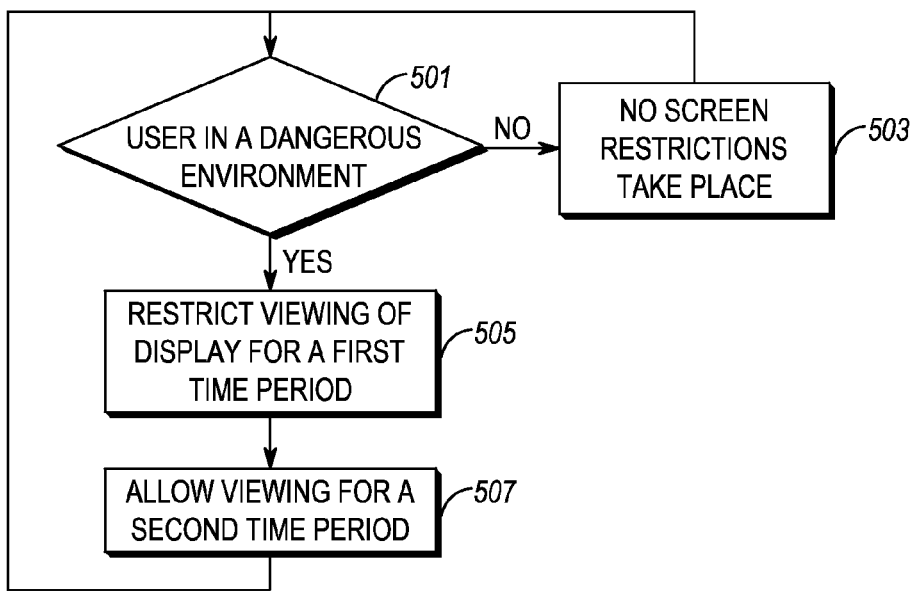
FIG. 5 is a flow chart showing the operation of the device of FIG. 4.

FIG. 5 is a flow chart showing the operation of the device of FIG. 4. More particularly, FIG. 5 is a flow chart showing those steps (not all are necessary) for reducing user distraction as described above. At step 501 context aware circuitry 407 and/or microprocessor 403 determines if a user is in an environment where they should not be distracted (particular environment). If the user is not in an environment where they should not be distracted (e.g., not in a dangerous environment), no screen restrictions take place (step 503). However, if it is determined that the user is in such an environment, the logic flow continues to step 505 where processor 403 restricts the viewing of screen/display 101 for a first period of time while the user is in the environment where they should not be distracted. This is accomplished by processor 403 utilizing timer 413. After the first period of time, processor 403 again allows the user to view the screen for a second period of time while the user is in the environment where they should not be distracted (step 507). The logic flow then returns to step 501.

It should be noted that processor 403 may determine that the user is in a safe environment (second environment) and eliminating any restrictions to viewing the screen. Additionally, as discussed above, processor 403 and context aware circuitry 407 may determine that the user is staring/glancing at the screen and have the second period of time measured from when the user begins staring at the screen.

Additionally, processor 403 and context aware circuitry 407 may determine that the user is in the process of interacting with an application and extend or shorten the second period of time based on the user's interaction with the application. As discussed, this may entail determining that the user is inputting text and extending or shortening the second period of time based on whether or not the user has finished inputting text.

As discussed above, the step of determining that the user is in the environment where they should not be distracted may comprise the step of receiver 402 receiving a Computer Aided Dispatch (CAD) incident identifier and having processor 403 base the determination that the user is in the environment based on the CAD incident identifier.

As discussed above, processor 403 and context aware circuitry 407 may be configured to determine that the user is in the environment where they should not be distracted by determining a motion of an individual and basing the determination that the user is in the environment based on the motion of the individual. Processor 403 and context aware circuitry 407 may determine that the user is in the environment where they should not be distracted by determining a location of an individual and basing the determination that the user is in the environment based on the location of the individual.

Figure 6:
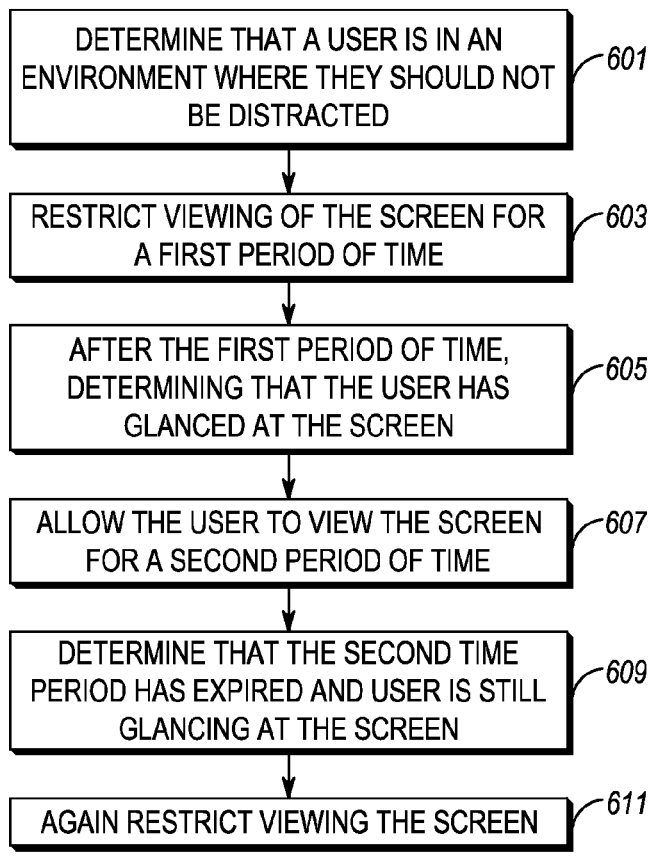
FIG. 6 is a flow chart showing the operation of the device of FIG. 4.

FIG. 6 is a flow chart showing the operation of the device of FIG. 4. The logic flow begins at step 601 where processor 403 and/or context-aware circuitry 407 determines that a user is in an environment where they should not be distracted. The logic flow then continues to step 603 where processor 403 sets timer 413 and restricts the viewing of a screen for a first period of time (Tblocked) while the user is in the environment where they should not be distracted. After the first period of time (e.g., timer 413 expiring), processor 403 determines that the user has glanced at the screen (step 605) and allows the user to view the screen for a second period of time (Tuse) by setting timer 413 beginning from when the user has glanced at the screen, and while the user is in the environment where they should not be distracted (step 607). Processor 403 determines that timer 413 has expired and the user is still glancing at the screen; (step 609) and again restricts the viewing of the screen 101 while the user is in the environment where they should not be distracted (step 611).

As discussed above, in a preferred embodiment of the present invention, a user is allowed to glance at the screen for a period of time (Tuse), prior to the screen being blocked. So, for example, when the user enters a dangerous situation, and is not glancing at the screen, Tuse will be started the moment the user glances at the screen. Once Tuse has expired, the screen will be blocked for a second period of time (Tblocked). Glancing at the screen during Tblocked will not enable the screen to be viewed. However, if the user glances at the screen after Tblocked has expired, the user will again be allowed to view the screen for the first period of time.

In the foregoing specification, specific embodiments have been described. However, one of ordinary skill in the art appreciates that various modifications and changes can be made without departing from the scope of the invention as set forth in the claims below. For example, the above approach was described as having two contexts, dangerous and non-dangerous. In an alternate embodiment the above approach can be extended to N different contexts, each with different configured time limits. For example, Off duty—unlimited viewing time, on patrol—15 second viewing time, traffic stop—4 second viewing time, making arrest—0 second viewing time. Accordingly, the specification and figures are to be regarded in an illustrative rather than a restrictive sense, and all such modifications are intended to be included within the scope of present teachings.

It should also be noted that the above description was written in the context of limiting a user's access to viewing a screen during situations where the user should not be distracted, however, one of ordinary skill in the art will recognize that the above text is not meant to limit viewing as described above to any particular environment. So, for example, if any situation exists where a screen should be limited as discussed above, the following claims are intended to cover those situations.

In another example, extremely important information should be shown to the user, even if the time limit for normal viewing of the screen has been reached. For example a CAD query indicates that a suspect has an outstanding arrest warrant. Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A computer implemented method for reducing user distraction by controlling viewing of a display screen in a particular environment, the method comprising the steps of:
   determining that a user is in a particular environment;
   restricting the viewing of the screen for a first period of time while the user is in the particular environment;
   after the first period of time, allowing the user to view the screen for a second period of time while the user is in the particular environment;
   again restricting the viewing of the screen while the user is in the particular environment;
   wherein the step of determining that the user is in the particular environment comprises the step of remotely receiving a Computer Aided Dispatch (CAD) incident identifier and basing the determination that the user is in the environment based on the CAD incident identifier.

2. The method of claim 1 further comprising the step of determining that the user is staring at the screen and wherein the second period of time is measured from when the user begins staring at the screen.

3. The method of claim 1 further comprising the steps of: determining that the user is in the process of interacting with an application; and extending the second period of time until the user has entered a complete field into the application.

4. The method of claim 1 further comprising the steps of: determining that the user is inputting text; and extending the second period of time until the user has finished inputting text.

5. The method of claim 1 wherein the step of determining that the user is in the particular environment comprises the further step of determining a motion of an individual and basing the determination that the user is in the environment based on the motion of the individual.

6. The method of claim 1 wherein the further step of determining that the user is in the particular environment comprises the step of determining a location of an individual and basing the determination that the user is in the environment based on the location of the individual.

7. The method of claim 1 wherein the step of restricting the viewing of the screen comprises the step of making the screen opaque or making a window on the screen opaque.

8. The method of claim 1 further comprising the steps of: determining that the user is in a safe environment; and eliminating any restrictions to viewing the screen.

9. A computer implemented method for reducing user distraction by controlling viewing of a display screen in a particular environment, the method comprising the steps of:
   determining that a user is in a particular environment;
   restricting the viewing of the screen for a first period of time (Tblocked) while the user is in the particular environment;
   after the first period of time, determining that the user has glanced at the screen;
   allowing the user to view the screen for a second period of time (Tuse) beginning from when the user has glanced at the screen, and while the user is in the particular environment;
   determining that the second period of time (Tuse) has expired and the user is still glancing at the screen; and
   again restricting the viewing of the screen while the user is in the particular environment;

wherein the step of determining that the user is in the particular environment comprises the step of remotely receiving a Computer Aided Dispatch (CAD) incident identifier and basing the determination that the user is in the environment based on the CAD incident identifier.

10. The method of claim 9 further comprising the steps of:
determining that the user is inputting text; and
extending or shortening the second period of time until the user has finished inputting text.

11. The method of claim 9 wherein the step of determining that the user is in the particular environment comprises the further step of determining a motion of an individual and basing the determination that the user is in the environment based on the motion of the individual.

12. The method of claim 9 wherein the step of restricting the viewing of the screen comprises the step of making the screen opaque or making a window on the screen opaque.

13. An electronic apparatus having controlled viewing of a display screen to reduce user distraction in a particular environment comprising:
a timer;
a receiver configured to remotely receive a Computer Aided Dispatch (CAD) incident identifier; and
a processor configured to determine that a user is in a particular environment based on the CAD incident identifier,
wherein the processor is configured to use the timer to restrict the viewing of the screen for a first period of time while the user is in the particular environment, and after the first period of time, allowing the user to view the screen for a second period of time while the user is in the particular environment,
and again restricting the viewing of the screen while the user is in the particular environment.

* * * * *